United States Patent
Assetto et al.

(10) Patent No.: US 6,941,475 B1
(45) Date of Patent: Sep. 6, 2005

(54) SYSTEM AND METHOD FOR EFFICIENT PROCESSING OF SERVICE REQUESTS

(75) Inventors: Gayle E. Assetto, Fort Collins, CO (US); Karen L. Middleton, Fort Collins, CO (US); Barton W. Gordon, Fort Collins, CO (US); Jeromey James Gaudreau, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 883 days.

(21) Appl. No.: 09/821,991

(22) Filed: Mar. 30, 2001

(51) Int. Cl.[7] .............. G06F 11/30; G06F 15/173; G06F 17/60

(52) U.S. Cl. ............... 713/201; 713/202; 705/1; 709/223; 709/225

(58) Field of Search .............. 713/201, 202; 705/1; 709/223, 225

(56) References Cited

U.S. PATENT DOCUMENTS

2002/0099566 A1 * 7/2002 Kobayashi ............... 705/1
2002/0143865 A1 * 10/2002 Tung Loo et al. ......... 709/203

* cited by examiner

Primary Examiner—Matthew Smithers
Assistant Examiner—Courtney Fields (57) ABSTRACT

A method and system for efficient processing of service requests requires a user to access the system and identify himself/herself. The user can then enter a request for a service. The identity and access to the requested service is then validated against an enterprise database. At this time, the need for risk acceptance approval is also carried out. If necessary, the user and manager are then queried for risk acceptance approval. If approved, the request is time-date stamped and forwarded to a service provider. User and request data are saved to a business logistics tracking database. If necessary, the user's manager is notified when renewal of the service is required, prior to expiration of the service. If the renewal is approved the service is then renewed.

21 Claims, 8 Drawing Sheets

300 please sign in...

services for hp employees

Please enter the employee # of the
PERSON RECEIVING THE SERVICE:

****** — 301

302 — Please select your site:   ○   ⊙   ○
                                 Roseville Rocky Mountain Bay Area

GO! HP — 303 services for non-hp employees

FIG. 4

| choose a service... | |
|---|---|
| HP Employee Receiving the Service: | |

| First Name: | John | Last Name: | Smith | |
|---|---|---|---|---|
| Dept. #: | 3045 | Entity-Subentity Code: | 0000 | 401 |
| MS: | 20 | Bldg & Post: | MD5 | |
| Telnet: | 123-4567 | | | |

400 — (form label)
402 — Select A Service: [Telephone ▼]

Service Description:
403 — Please Select A Service

Please Select The Options You Would Like For This Service:
404 — Please Select a Service Please Complete These Required Fields:
405 — Please Select A Service Contact Information:

| Contact Name: | John Smith | ~406 ? |
| Contact Telnet: | 123-4567 | ~407 ? |
| Manager's Name: | Janet Smith | ~408 ? |
| Manager's Telnet: | 234-5678 | ~409 ? |

Please enter in the telnet number or the employee's manager. Telnet numbers must be submitted using a seven-digit format. (e.g. 898-8000)

Additional Comments/Instructions: 410

Comments [   ▲▼ ]

412 — [EXIT]  [SUBMIT] — 411

FIG. 5

| check your order... | | |
|---|---|---|
| HP Employee Receiving the Service: | | |
| First Name: John | Last Name: Smith | |
| Dept. #: 3045 —502 | Entity-Subentity Code: 0000 | 501 |
| Bldg-Post: MD5 —503 | MS: 20 | |
| Telnet: 123-4567 —504 | | |
| Order Detail: | | |
| | | Date: 3/15/01 3:10:07 PM |
| Service Requested: | New Telephone | |
| Service Description: | Order a digital telephone —505 | |
| Site: | FtCollins | |
| Physical Location: | | |
| Phone Model: | M2616 —506 | |
| Do They Need Voice Mail: | No —507 | |
| Do They Want A Headset: | No —508 | |
| Contact Name: | John Smith —509 | |
| Contact Number: | 123-4567 | |
| Additional Comments: | | |
| Manager's Name: | Janet Smith —510 | |
| Manager's Telnet: | 234-5678 | |

Please verify that the above information is correct before sending your order.

[ SEND US YOUR ORDER ] —512
[ EDIT YOUR ORDER ] —511
[ CANCEL YOUR ORDER ] —513

FIG. 6

Q electronic communications request — hp rocky mountains — 605

You Have Placed The Following Order. You will be notified within 24-48 business hours when the service you ordered is up and running. Please print this page for your order confirmation. If you have any questions regarding this order, please contact the HelpDesk at 898-9000.

| | | | |
|---|---|---|---|
| Service Requested For: | John Smith | | |
| Date Requested: | 3/15/01 3:10:58 PM | | |
| Dept. #: | 3045 | Entity – Subentity Code: | 0000 |
| Bldg-Post: | MD5 | MS: | 20 |
| Telnet: | 123-4567 | | |

Order Detail:

| | |
|---|---|
| Service Requested: | New Telephone |
| Status: | APPROVED – IN PROCESS |
| Service Description: | Order a digital telephone |
| Site: | FtCollins |
| Physical Location: | THIS IS A TEST, PLEASE DISREGARD. |
| Phone Model: | M2616 |
| Do They Need Voice Mail: | No |
| Do They Want A Headset: | No |
| Contact Name: | JOHN SMITH |
| Contact Number: | 123-4567 |
| Additional Comments: | THIS IS A TEST, PLEASE DISREGARD. |
| Manager's Name: | JANET SMITH |
| Manager's Telnet: | 234-5678 |

| Request another service for this employee | Request a service for a different employee | FCS Campus Page |
|---|---|---|

FIG. 7

700 choose a service...   701

Note: If you have needs in regards to moves please call x86683. If you are experiencing problems with using ECR please call x25999.

| HP Employee Receiving the Service: | | | |
|---|---|---|---|
| First Name: | John | Last Name: | Smith |
| Dept. #: | 3045 | Entity-Subentity Code: | 0000 |
| MS: | 20 | Bldg/Floor/Post: | MD5 / / 20E |
| Telnet: | 123-4567 | | |

Select A Service:   (Choose One) ▼

Service Description:

Please Select A Service

Please Select The Options You Would Like For This Service:

Please Select a Service

Please Complete Those Required Fields:

Please Select A Service

Contact Information:

Contact Name: [          ] ?

Contact Telnet: [          ] ?

Please enter in the telnet number of a person that can be contacted if there are any questions. Telnet numbers must be submitted using a seven-digit format. (e.g. 785-5555)

Manager's Name: [          ] ?

*FIG. 8*

You Have Placed The Following Order:
Your order number is 103-4195. Please print this page for your order confirmation. If you have any questions regarding this order, please contact the HelpDesk at 785-5555.

| | | | |
|---|---|---|---|
| Service Requested For: | John Smith | | |
| Date Requested: | 3/16/01 3:12:33 PM | | |
| Dept #: | 3045 | Entity-Subentity Code: | 0000 |
| Bldg/Floor/Post: | MD5//20E | MS: | 20 |
| Telnet: | 123-4567 | | |

Order Detail:

| | |
|---|---|
| Service Requested: | New LAN Line |
| Status: | APPROVED - IN PROCESS |
| Service Description: | Order a new LAN Network cable for your cubicle. |
| Priority: | 5 |
| Physical Install Location: | THIS IS A TEST, PLEASE DISREGARD. |
| Lan Type: | NT |
| Contact Name: | John Smith |
| Contact Number: | 123-4567 |
| Additional Comments: | THIS IS A TEST, PLEASE DISREGARD. |
| Manager's Name: | JANET SMITH |
| Manager's Telnet: | 234-5678 |

| Request another service for this employee | Request a service for a different employee | FCS Campus Page |
|---|---|---|

- # SYSTEM AND METHOD FOR EFFICIENT PROCESSING OF SERVICE REQUESTS

BACKGROUND

Typically, when a person requires to initiate services in an enterprise, such as, by way of example, telephone service, email service, voice mail, or perhaps long distance capabilities, the requester would have to complete one or more paper forms. These forms have been necessary, and still are necessary in most instances, because of approval levels required to be signed off on by management. Once approved, the forms would then be used to initiate service, and in some cases would be used to follow up on a service at a later time. Again, in the typical scenario, these forms would move from person to person and would act as the trigger to get something done.

Such a process is not only time consuming, but results in inefficiencies because people must send the forms properly to the next stage in the process and often a simple misspelling of a name or the transposition of a routing address number could result in delays in the provision of the service. Moreover, vacations, personnel changes, distractions, faulty filing, in short, any number of factors could (and do) go wrong causing delays and added cost and frustration.

SUMMARY OF THE INVENTION

The present invention is directed to a system and method for a centrally accessible service initiation tool that automates the management approval and business control aspects of a service request. The system handles a large variety of service requests and coordinates all aspects of those requests.

The tool is accessible to both onsite and remote workers and assures quality of the order processing procedure because checks are made for completeness and accuracy of the input data. The approval process, i.e. obtaining management "signatures" is automated assuring that there are no gaps in the audit process and that the process is trackable without administrative processing time.

Using the inventive concepts, all of the services are in a common standard framework. Any changes to the process can be made very quickly and assured to be applied appropriately to all related services so there is no discrepancy of standards between services.

In operation, a user accesses the system and identifies himself/herself and enters a request for a service. The identity and access to the requested service is then validated against an enterprise database. If necessary, the user and manager are then queried for risk acceptance approval. If approved, the request is time-date stamped and forwarded to a service provider. The request is saved to a business logistics tracking database. If necessary, the user's manager is notified when renewal of the service is required, prior to expiration of the service. If the renewal is approved, the service is then renewed without interruption and without the need for human intervention.

BRIEF DESCRIPTION OF THE DRAWING

FIG. 6 is an illustration of a graphical user interface confirming receipt of a service request in the present system;

DETAILED DESCRIPTION

Figure 1:
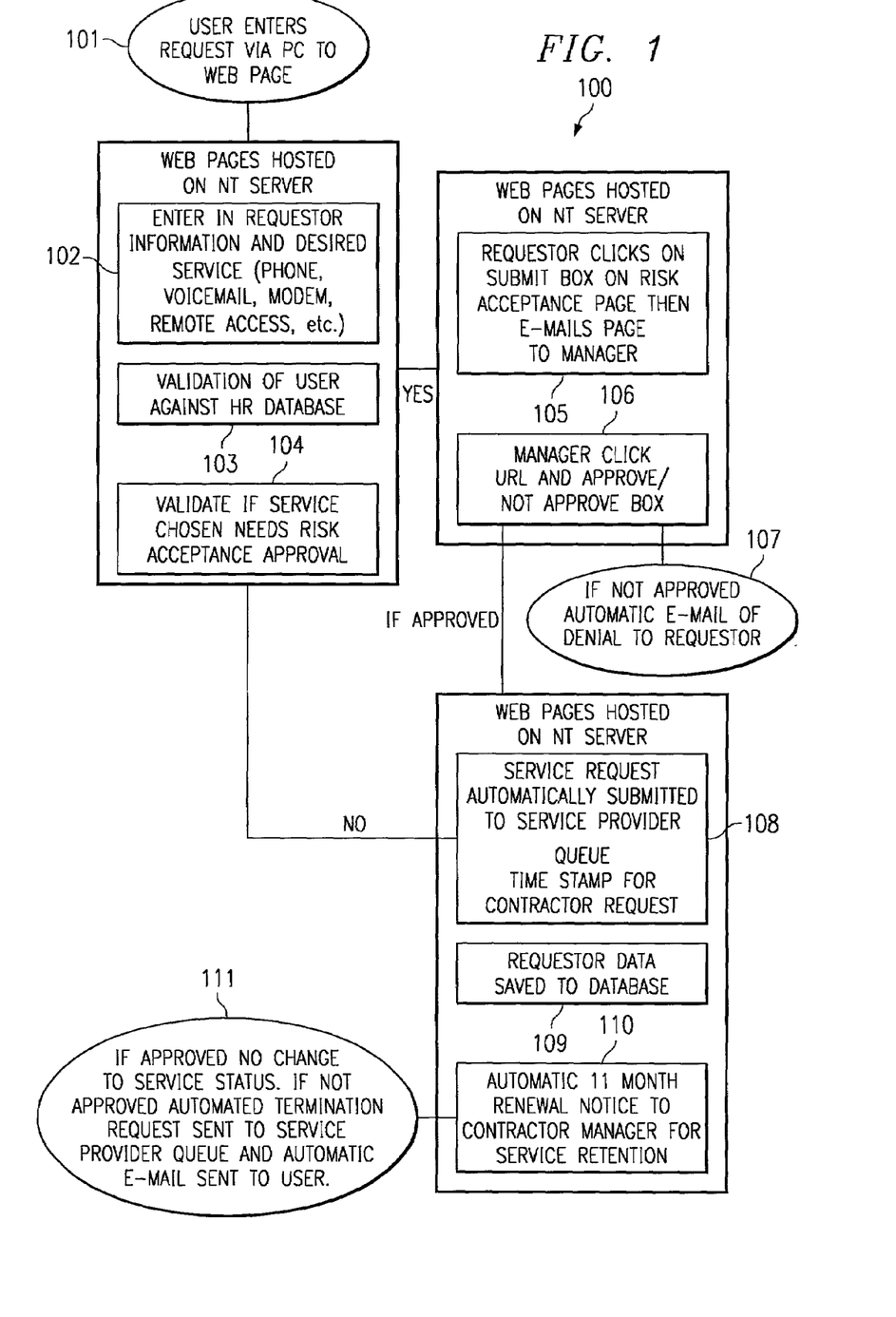
FIG. 1 shows a flow chart diagram of the system and method for efficient processing of service requests.

FIG. 1 shows process 100 for the electronic communication request (ECR). In step 101 the user enters a request, via PC, onto the ECR web page. The web page itself can be hosted on any server, for example, an NT server.

The information entered at box 102 includes the desired service, whether it be for a new phone, voicemail connection, modem, remote access, etc. The information is validated at box 103 against a resource database to assure that the person signing up is actually a member of the enterprise and is authorized for the requested service.

Provided that the validation from the enterprise database comes back positive, (meaning that the requester is a member of the enterprise, either formally or by contract, as a contractor employed by the company) the request then goes to another web page in which the requester, if necessary, (based on employee type or service type, box 104) is asked to review a risk acceptance statement that must be agreed to prior to submitting the order, as shown by box 105. A web page takes the requester automatically to a web page containing the risk acceptance statement. The user then clicks OK for acceptance, via an automated button on the displayed web page. Once accepted, the system automatically emails the information to the requester's manager, in which the manager is then given the web address (URL). Upon reading the e-mail message, the manager clicks on the web location within the email to bring another web page for approval (disapproval), as shown in box 106. The manager can accept or reject this request.

If the manager hits the reject button, the system automatically sends, box 107, an email stating the denial back to the requester. If the manager hits the approval button contained within the web page, the system goes to another web page within the application. The approved service request is automatically submitted to the service provider queue for allowing performance of the activity necessary to engage the service for the requester and a time stamp of day and time is logged, box 108. Requester data is saved to a database, box 109, along with information pertaining to the service requested.

If the requester is a contractor (or other special flag on the file), after a period of time, for example eleven months, an automatic renewal notice is sent via email (box 110) to the contractor's manager prompting the manager to go to a specific web address or URL to approve (or deny) renewal of the service. Upon denial of the service renewal, an email termination notice is sent to the user and the service department is notified to terminate service, via box 111. Upon renewal, the service continues.

Note that system 100 distinguishes based on employee type, or on any other criteria. If the requester is, for example, a contractor, the system will automatically take the requester to a particular page to be certain conditions are met or agreed upon.

Figure 2:
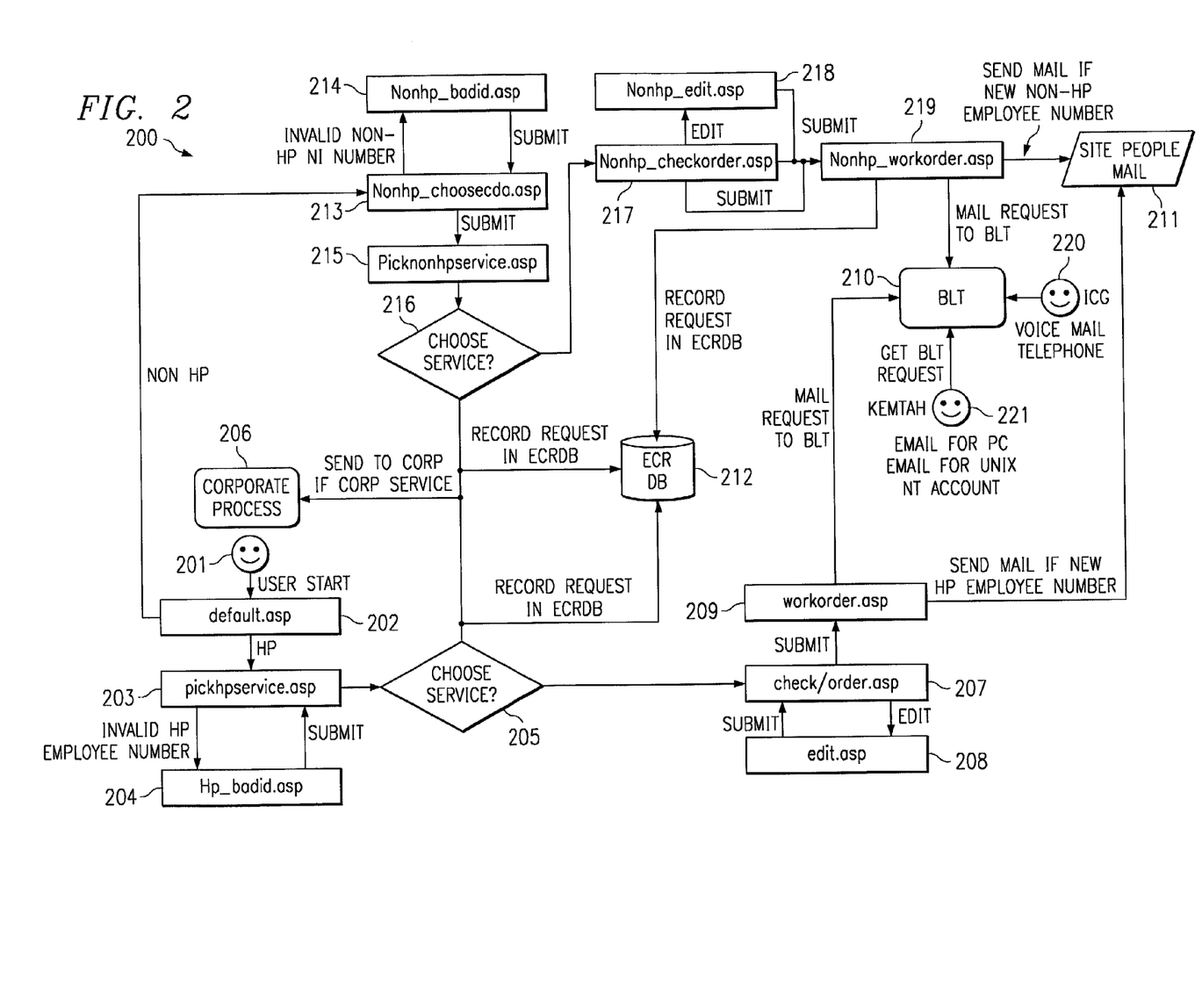
FIG. 2 shows a flow chart diagram of the preferred embodiment of the system as applied to a Hewlett Packard system service request.

Turning to FIG. 2, a more detailed example 200 of the invention pertaining to a Hewlett Packard (HP) system is shown. This is one embodiment only and any number of configurations and sequences of operation will work User start 201 begins the process of ordering a service or group of services from the information technology (IT) group. The user goes to the web address, ecr.fc.hp.com, and will be brought to page 202, known as the default.asp. The user will then be prompted to enter some information. Depending on whether the user is an HP employee or non-HP employee, the system will ask the user to enter his/her HP employee number. The system obtains their name and internal billing information, along with other pertinent information required. The user is then taken to a page 203, known as pickHPservice.asp. At pickHPservice.asp, the employee number is matched against an enterprise directory database which contains all the HP and managed team employees. The database is queried to obtain the employee's name, both first and last, the employee's phone number, if applicable, their department number, their physical location, where they sit at in the company, and their email address. The system will begin to spawn the request. If the user is not a valid employee, the system goes to page 204, which is HpbadID.asp. The user is prompted that the employee number was not a valid employee number and then asked to reenter the employee number.

With respect to that user, the system goes no further until a valid employee number is provided. Once the proper information has been successfully attained the user is asked, box 205, to pick a service, or services that they would like to order. The user can order many different information technology services including a telephone 220, voice mail or a local area network (LAN) connection. The user can also order a modem, a Windows NT account and PC email 221, along with a variety of other services. Based on the services that are selected, for example, a Windows NT account, ECR will ask for the required information to be able to spawn the account and ask the user if he/she has a previous email account. If the user does not have a previous email account, ECR will create an email account. ECR will ask if the user requires certain things that pertain to a Windows NT account, such as an NT network share, an IP address, or some network shares created on other drives. Once the information is collected, the system submits the information, including the contact information and any possible additional instructions required. This information will go to one or two places. If the service is a corporate process, such as a calling card, a cellular phone or a phone extend, the user is taken to the appropriate corporate process page 206. If the request matches a listing service offered through the system, the user is taken to checkorder.asp 207 and a page displays the information the user has entered and the user is asked to verify the information. The user can edit the information at 208. Once the user submits the edited order, he/she is taken back to the checkorder.asp 207 and is presented the information again for verification. Once the user verifies the information at the checkorder.asp 207, he/she moves to the next step, workorder.asp, 209. At workorder.asp business logistics tracking ticket (BLT) 210 is spawned. The system spawns the BLT to notify the appropriate technician that the service needs to be created or setup.

If the employee was not found in the employee database, a mail message 211 is spawned through the appropriate personnel to add the new employee to the enterprise database. The employee-user is notified that his/her service request has been spawned. The employee-user is given a tracking number which can be used to check the order status of that specific work order.

After the work order is submitted at workorder.asp, the work order is tracked and the employee is sent the order information. The information is also sent to the ECR database 212 which tracks all the order information for audit, renewal or reference purposes.

At the default.asp page 202, the non-HP employee user is prompted for his/her non-HP employee information. A non-HP employee cannot order their own service. A non-HP employee service must be ordered by an HP employee. When a non-HP employee number is entered, ECR prompts the user for the employee number of an HP employee, such as the user's HP Manager.

The user is taken to the risk acceptance form nonHP_chooseCDA.asp 213. The user is then asked what kind of contractor he/she is (an individual contractor working for HP or a contractor working for a contractor company), that HP has contracted. Depending on the answer submitted, the necessary risk acceptance forms for the associated HP employee manager or for the person ordering the service or services are displayed. The employee is then asked to either submit or decline acceptance. If declined the user is sent back to the beginning of the process, the service is not ordered, and no further action is taken. If the employee accepts, the non-HP employee number is compared against the HP enterprise directory.

If the employee number is invalid, the system goes to page 214, which is nonHp_badID.asp. The user is prompted that the employee number was not a valid employee number and then asked to reenter the employee number.

Once a valid employee number is entered, the information is then taken to the picknonHPservice.asp 215 to begin spawning a request order. The user can pick the service or services required such as a telephone, voice mail, local area network connection or modem. Depending on the service chosen, the user is prompted for specifics for that service, such as options or requirements needed to install the service. Additional comments or additional instructions may be entered at the picknonHPservice.asp page. Upon submission, the request is examined 216 and depending on the type of request, sent to the appropriate location, such as corporate process 206 for information which can be sent out to the appropriate web page web site. For other requests, the user is taken to a nonHP_checkorder.asp page 217 and asked to verify the information that has been entered. The user can choose to edit the information, or submit the information. If the user chooses to edit the information, he/she is taken to the nonHP_edit.asp 218 page. Once the information is submitted, the user is taken to the nonHP_workorder.asp 219 page. From the nonHP_workorder.asp page, a workorder is sent to the BLT, 210 so the work order request can be spawned and the appropriate technicians can be notified to begin processing the request. Also, email is spawned through the appropriate people 211 to add the non-HP employee to the enterprise directory. The non-HP ordering information is also submitted into the ECR database 212 to be used for auditing, renewal, or troubleshooting purposes.

Figure 3:
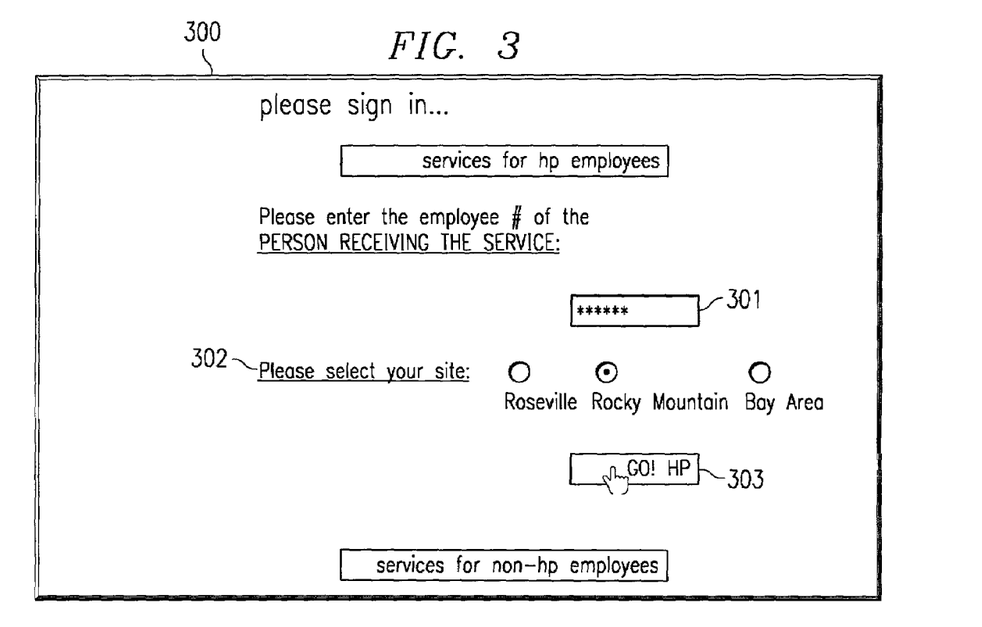
FIG. 3 is an illustration of a graphical user interface used to enter the identification number of a user in the present system.

Turning now to FIG. 3, an illustration of an ECR website screen 300 in accordance with the present system, disclosing the request for information from box 102 and more specifically the default.asp of FIG. 2, is shown. The user is prompted for information such as employee number in field box 301 and indication of the user's current site at 302, and a button 303 which will send the user to the next step.

Figure 4:
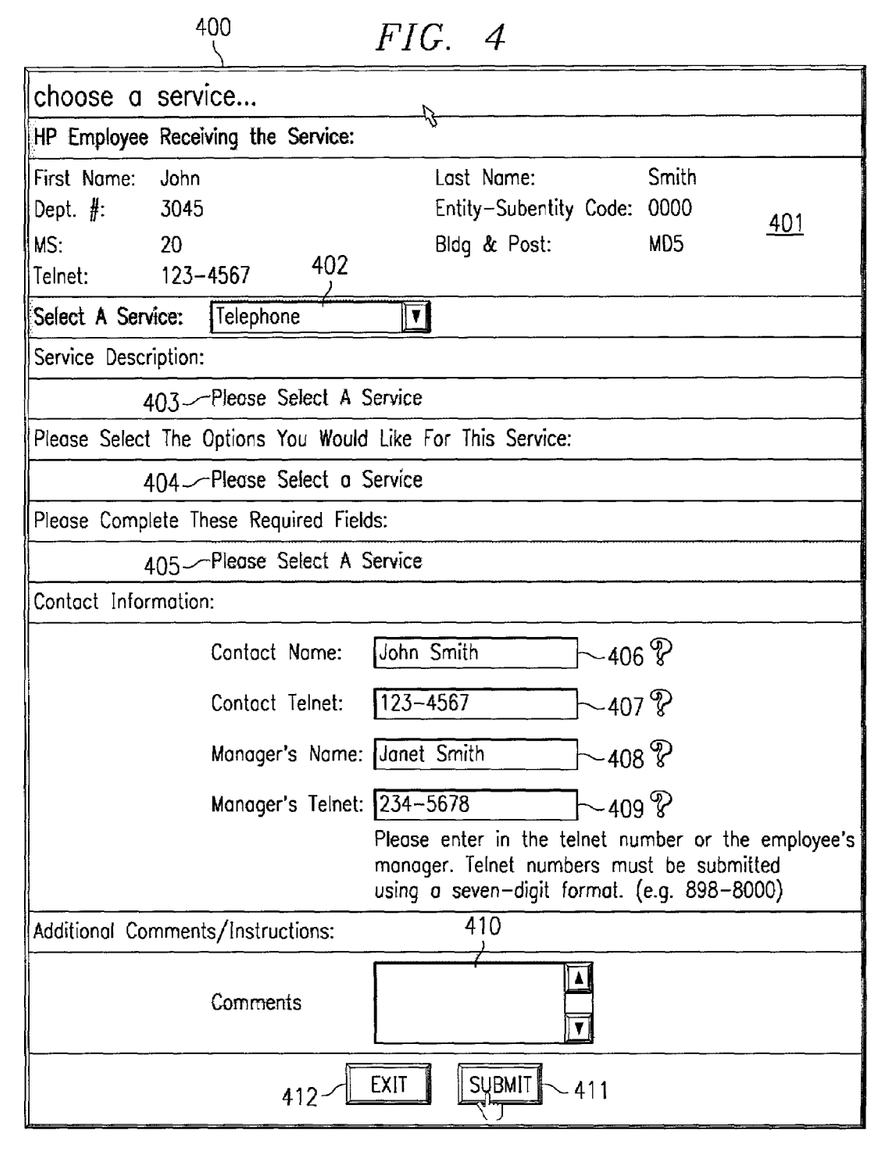
FIG. 4 is an illustration of a graphical user interface used to enter a service request and contact information in the present system.

FIG. 4 is an illustration of the next website screen of our example, further representative of step 102 and more specifically of the pickHPservice.asp 203. This screen 400 returns the information 401 acquired from the enterprise directory for the user, and asks the user to select the service from the services available, 402. Based on the service selected, a description 403 of the service will be displayed and the user will then be prompted for appropriate information for options 404 related to that service and any other required information 405. The user is then prompted for contact name, 406 contact phone number 407, the user's manager's name 408 and the manger's contact number 409. The user may input additional instructions or comments at 410. The user may choose to either submit using button 411, which will take the user to the next step of the process, or exit, via button 412, which will take the user out of the ECR system.

Figure 5:
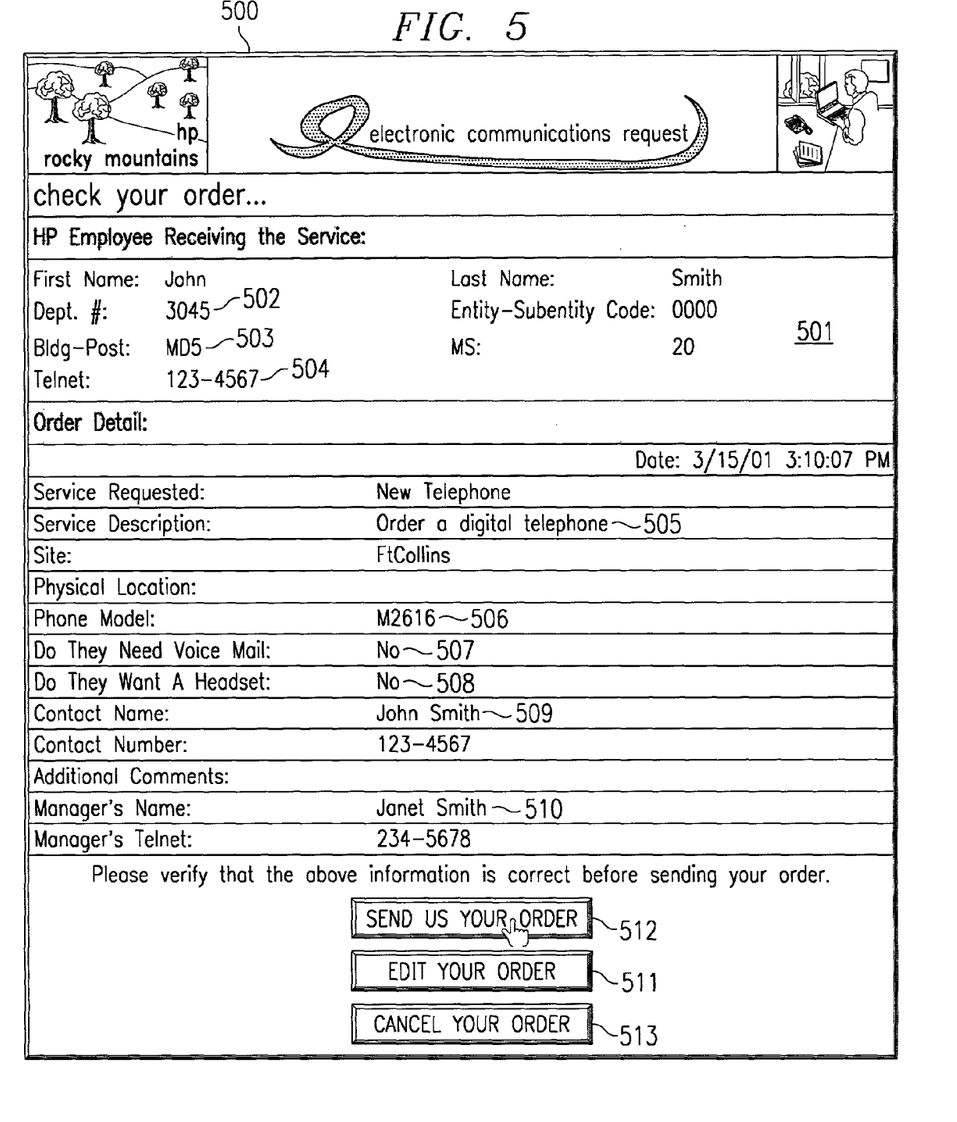
FIG. 5 is an illustration of a graphical user interface used to confirm a service request in the present system.

Turning to FIG. 5, a screen for the checkorder.asp web page 500, in accordance with box 207 above, is shown. This page 500 displays all the information the user has input for verification. The identity of the user is displayed in 501, including data returned from the enterprise database such as department number 502, building or post 503 and telephone number 504. Other information displayed is based on the type of request made, for example, in FIG. 5 an order for a digital telephone 505 is shown for illustrative purposes. The data returned includes the phone model 506, voice mail preference 507, and headset request 508, along with the contact information for both the user 509 and their manager 510. On this page, the user can edit the order by selecting button 511, proceed to the next step of ECR of submitting a workorder by selecting button 512 or cancel the order with button 513.

FIG. 6 is a sample workorder page 600 which is spawned by the system. The order has been submitted into the BLT system which will alert the appropriate technician to begin work on the order. If the user was not in the enterprise directory, the appropriate email is spawned to add the user to the enterprise database. The user is notified by page 600 that they have placed an order and gives him/her a status report 601 on the request, as well as time and date stamping the order 602. The identity of the user is restated at 603 and the order information is restated at 604. The user is encouraged to print out this page for their record keeping needs at 605. A contact number for questions regarding the order is also provided at 606.

Figure 7:
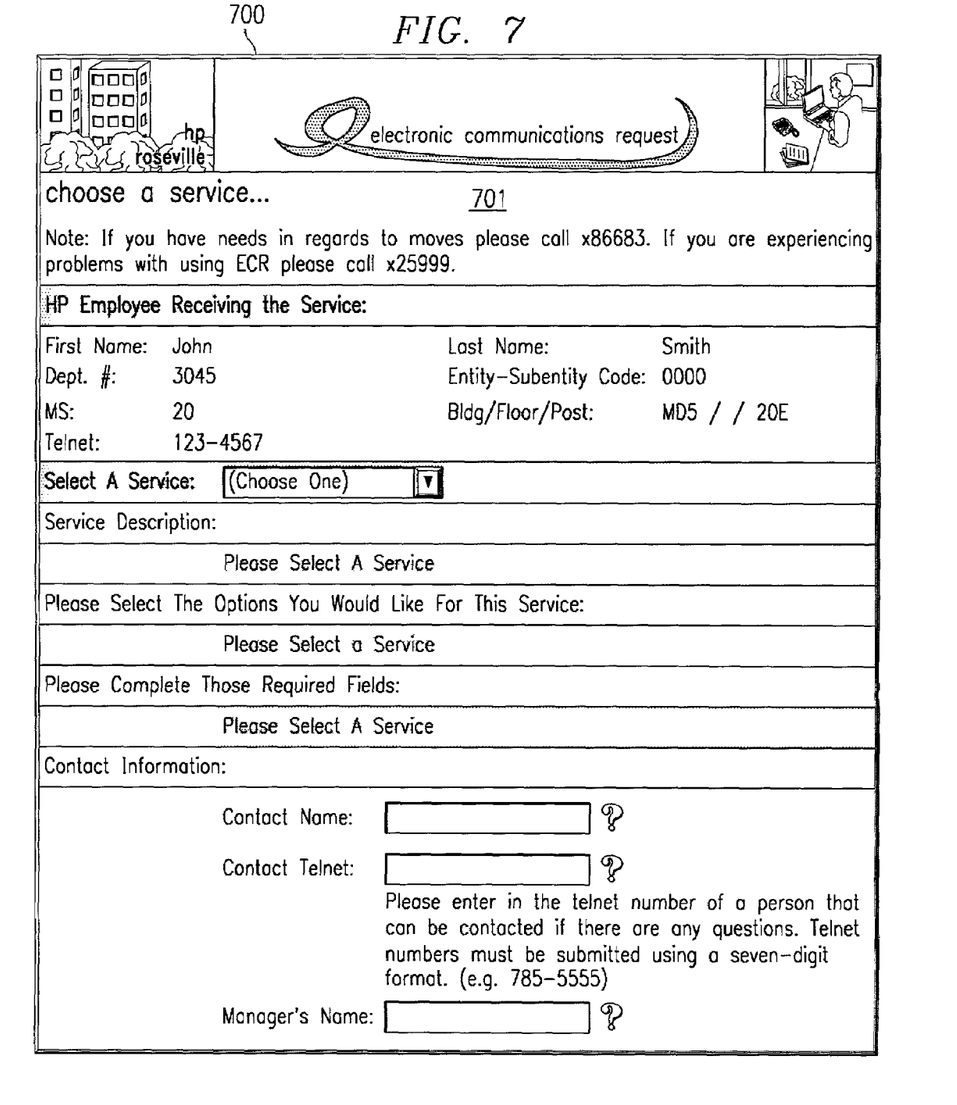
FIG. 7 is an illustration of a graphical user interface used to enter a service request and contact information from a particular geographical location for the present system.

FIG. 7 shows variations based on geographic region. The user's location might dictate support options. The appropriate content 701 maybe displayed in screen 700. For example, in FIG. 7 the appropriate contact numbers 701 for a help desk and ECR support is displayed for that user's geographic location.

Figure 8:
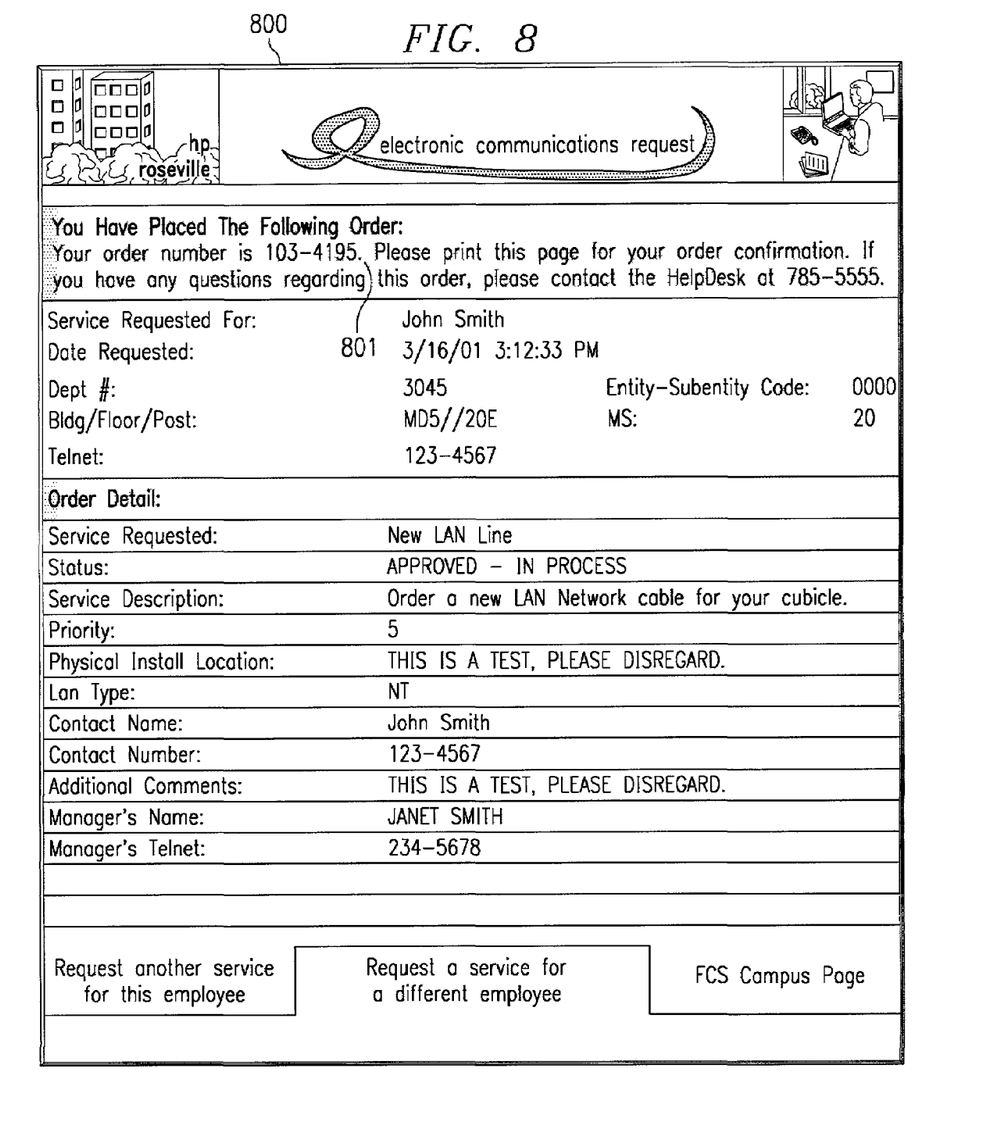
FIG. 8 is an illustration of a graphical user interface confirming receipt of a service request from a particular geographical location in the present system.

FIG. 8 illustrates an example of a work order screen 800 for an employee in a particular geographic location. The ECR has shown the work order tracking number 801 which the user can use as a reference number. If the user has any problems or questions regarding the order, he/she can use the number as a reference number and pull up their appropriate order with the aid of a help desk technician.

What is claimed is:

1. A system for efficient processing of service requests, said system comprising:
   at least one remotely accessible server for receiving a request from a user for at least one service provided by an enterprise;
   means controlled by an accessed one of said servers for validating identity of an accessing user;
   means based upon determination of a valid identity of said accessing user for evaluating a need for a risk acceptance agreement from said accessing user for a requested service;
   means controlled by said accessed one of said servers for obtaining approval, if required, of said risk acceptance agreement from said accessing user and for obtaining any necessary management approvals for said requested service; and
   means controlled by said accessed server for ordering said requested service for said accessing user.

2. The system of claim 1 further comprising means controlled by one of said servers for obtaining online approval to renew said requested service for said user.

3. The system of claim 1 wherein said means for obtaining approval further comprises means for emailing an accessing user approved acceptance agreement to said manager for said approval.

4. The system of claim 3 further comprising means for sending a web address to said manager for accessing said risk acceptance agreement.

5. The system of claim 1 further comprising means for time and date stamping said request.

6. The system of claim 5 further comprising means for storing said time and date stamped request.

7. A method for efficient processing of service requests by a user comprising the steps of:
   entering, by a requesting user, a request for at least one service onto a web page;
   validating said requesting user's identity against an enterprise database;
   determining if said request requires further approvals;
   obtaining, online, all determined approvals from said requesting user and from management; and
   submitting approved ones of said requests to a service provider.

8. The method of claim 7 further comprising the step of notifying said user of renewal prior to expiration of provided on of said service.

9. The method of claim 8 wherein said notifying step comprises the steps of:
   notifying a manager of the need for said renewal;
   accepting renewal approvals from said manager;
   renewing approved ones of said services; and
   terminating non approved ones of said services.

10. The method of claim 7 wherein said entering step further comprises the step of identifying said requesting user.

11. The method of claim 7 wherein said obtaining step further comprises the steps of:
    said requesting user agreeing to a risk acceptance agreement; and
    emailing said risk acceptance to a manager.

12. The method of claim 11 wherein said emailing step further comprises the step of sending a web address to said manager said web address being a network location containing contents pertaining to said manager's approval.

13. The method of claim 7 wherein said validating step validates identity of said requesting user as a member of an enterprise.

14. The method of claim 13 wherein said requesting user is an employee of said enterprise.

15. The method of claim 13 wherein said requesting user is a contractor for said enterprise.

16. The method of claim 7 wherein said validating step validates that said requesting user is authorized to request said service.

17. The method of claim 7 wherein said submitting step further comprises the steps of:
 time and date stamping said request; and,
 saving user data and request data to a business logistics tracking database.

18. The method of claim 7 further comprising the step of terminating, under control of information stored in a database at time of submitting said approved ones of said requests to said service provider, a provided service to a user after a period of time if no subsequent renewals are obtained.

19. A system for efficient processing of service requests, said system comprising:
 at least one remotely accessible server, said server hosting viewable pages accessible by a user to identify said user and to place requests by said user for services from an enterprise; and
 an enterprise database including information associated with the identity of users and services offered by said enterprise, said information including status of said user as one of a group consisting of employees and contractors of said enterprise, risk acceptance requirements for a service for an identified user, and information associated with requests and associated users, said database operable to direct via electronic communication service requests from users to proper people for approval prior to placing an order for said requested services.

20. The system of claim 19 wherein said server is accessible via one of a group consisting of the Internet, direct dial-up connection, an Intranet of said enterprise, a wide area network, and a local area network of said enterprise.

21. The system of claim 19 wherein said database includes information associated with necessary manager approval of risk acceptance requirements for said user and said service.

\* \* \* \* \*